Feb. 7, 1967 — E. M. PAUWELS — 3,302,478
ADJUSTABLE STEERING COLUMN
Filed March 26, 1965 — 5 Sheets-Sheet 1
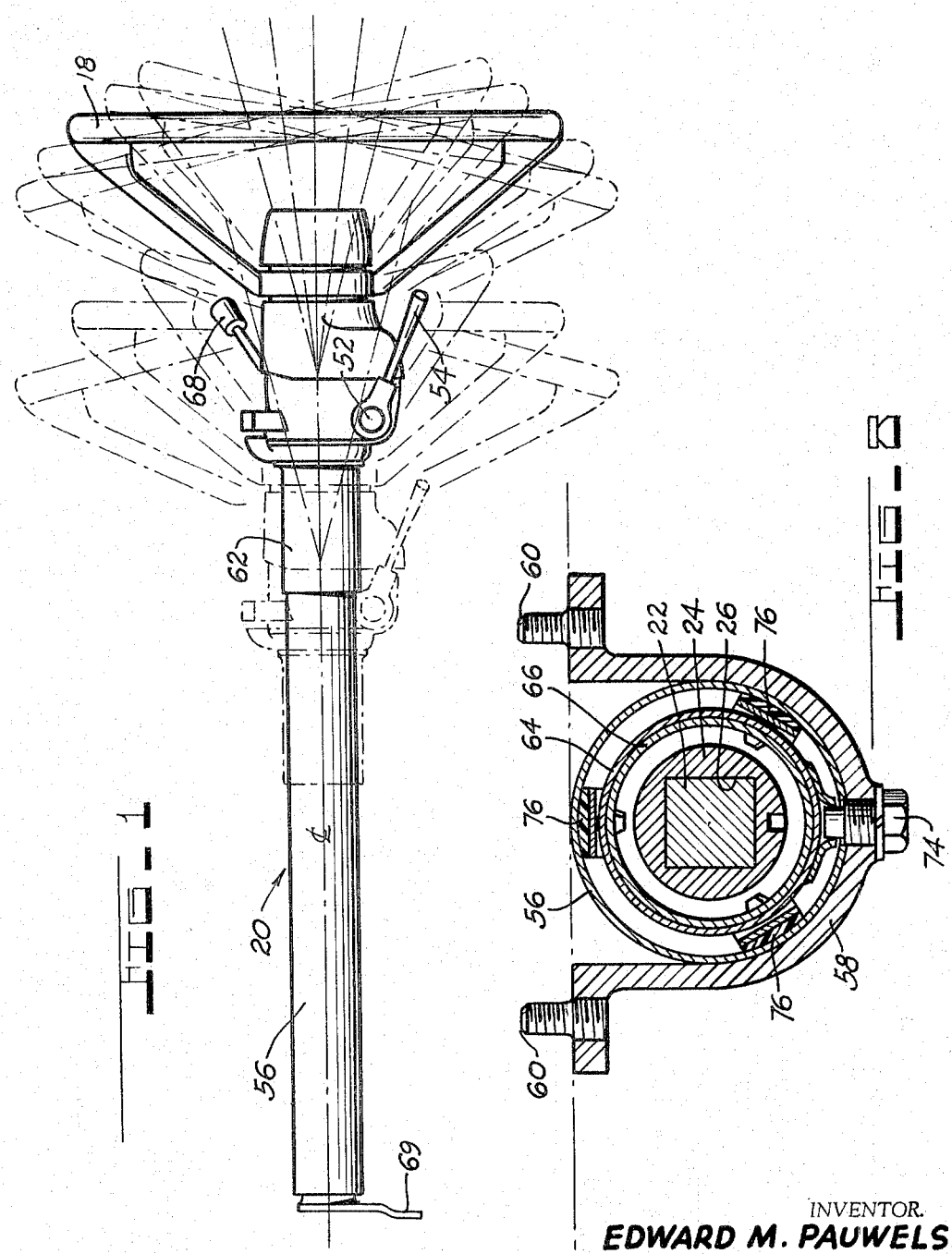
INVENTOR.
EDWARD M. PAUWELS.
BY
*William N. Antonis*
ATTORNEY.

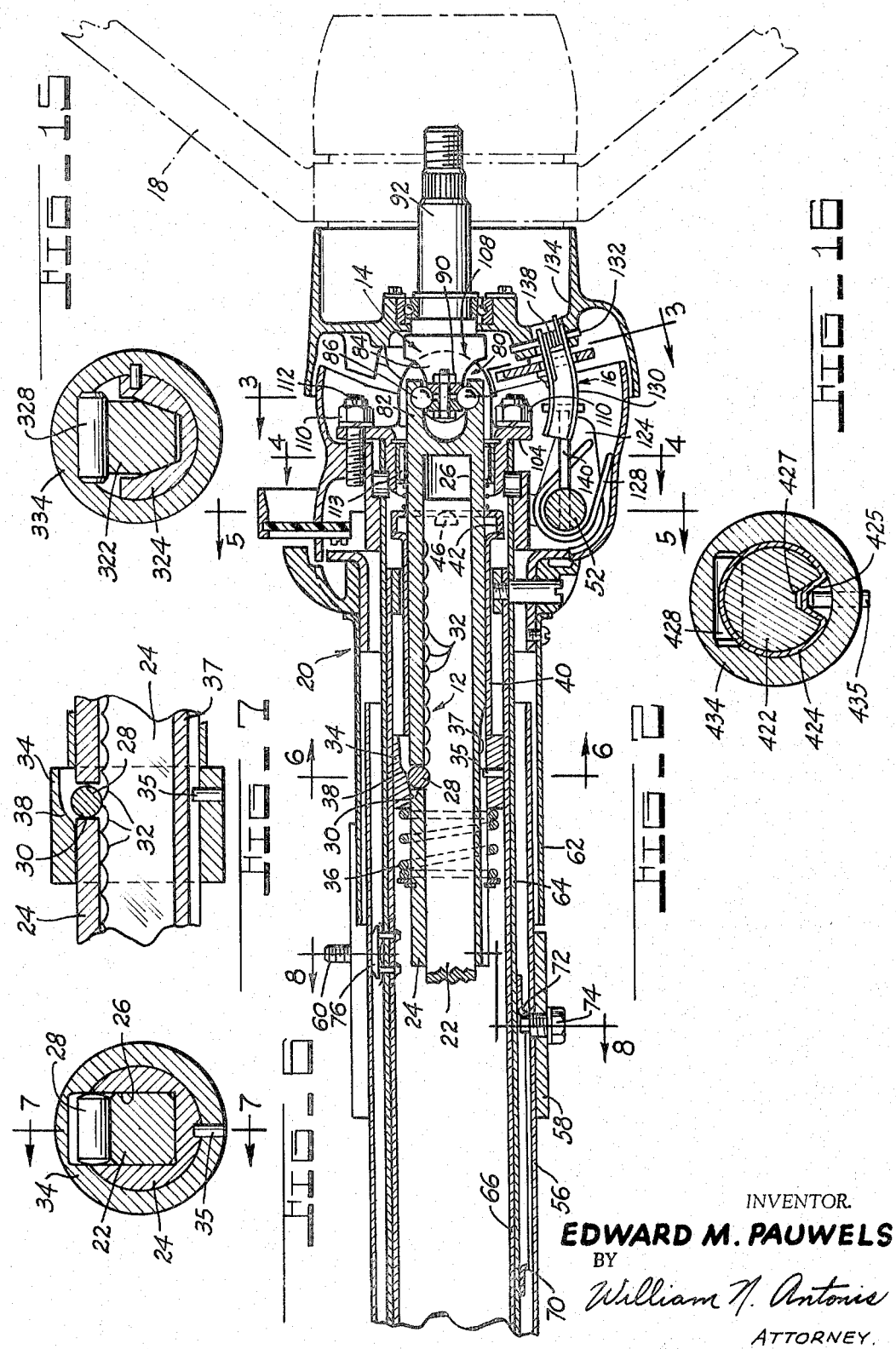

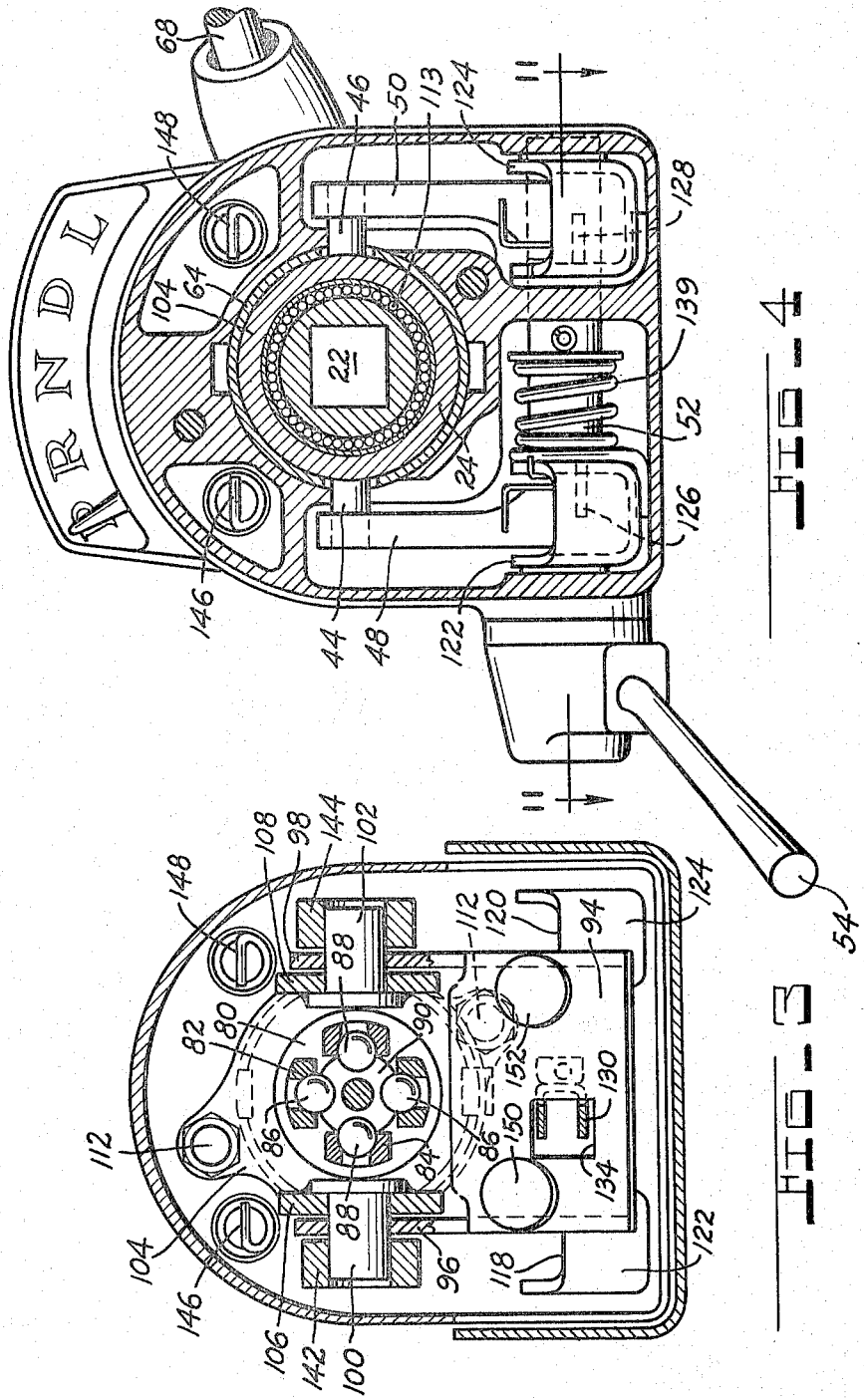

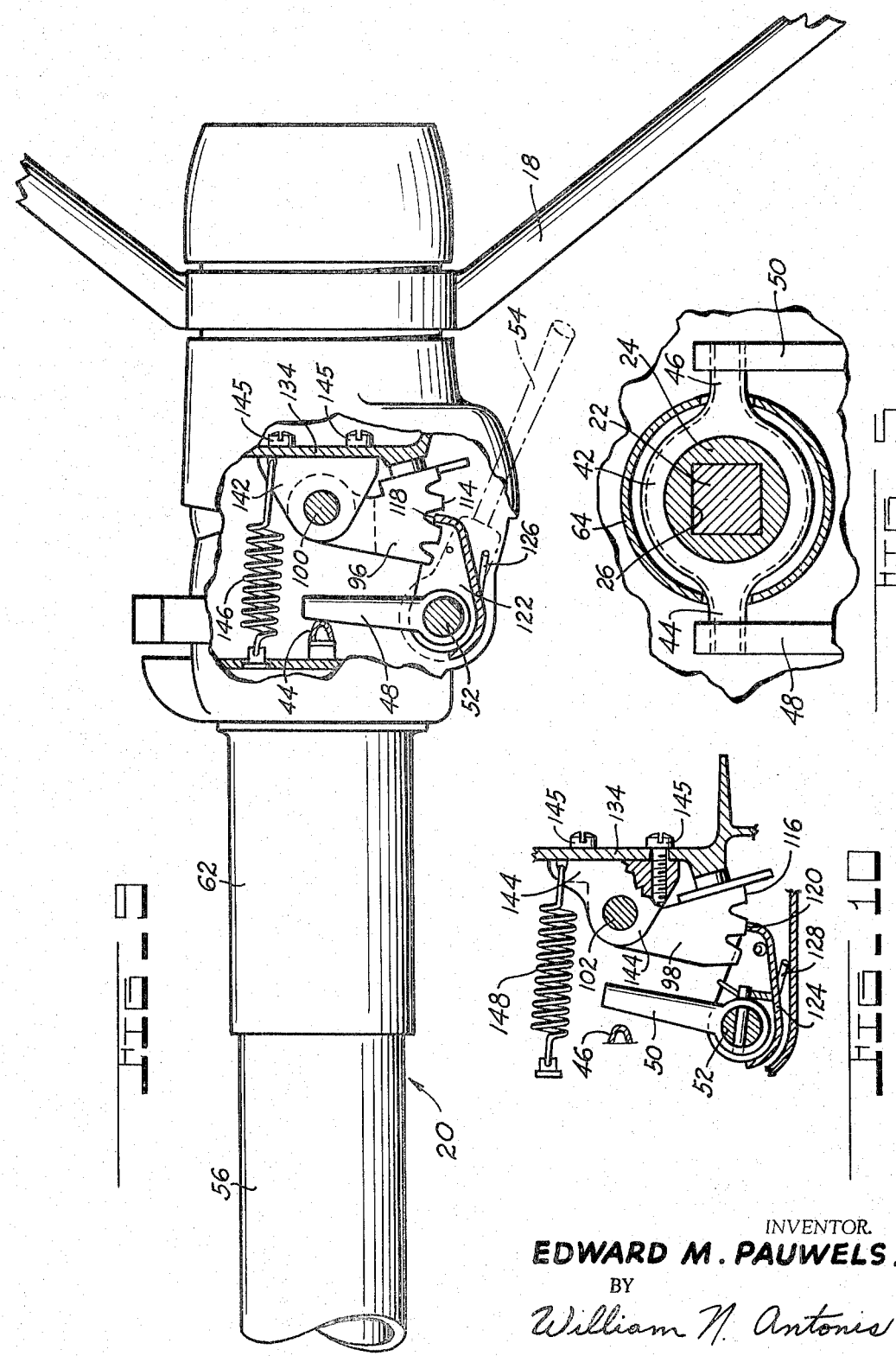

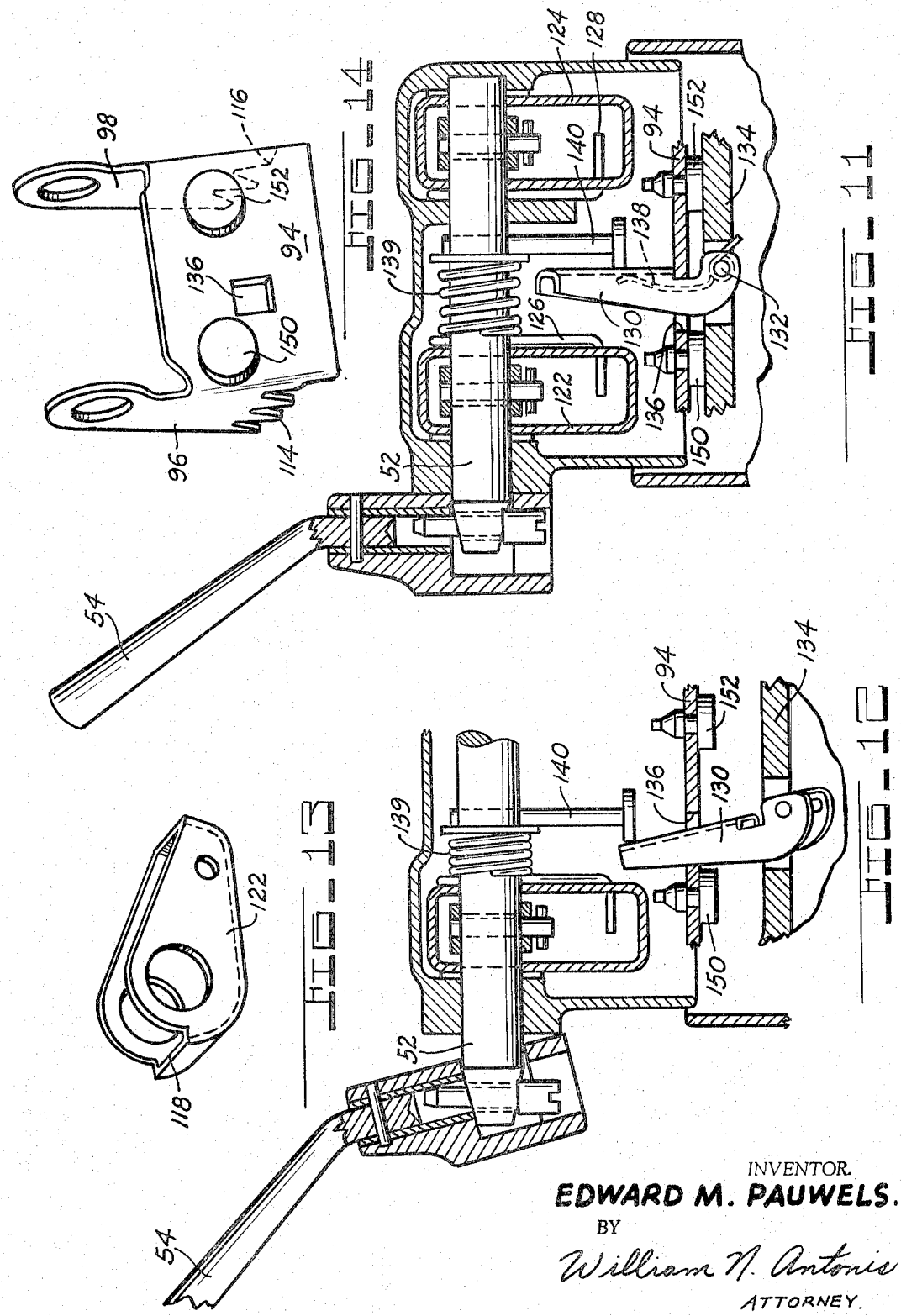

United States Patent Office 3,302,478
Patented Feb. 7, 1967

3,302,478
ADJUSTABLE STEERING COLUMN
Edward M. Pauwels, South Bend, Ind., assignor to The Bendix Corporation, South Bend, Ind., a corporation of Delaware
Filed Mar. 26, 1965, Ser. No. 442,912
9 Claims. (Cl. 74—493)

This invention relates to the steering mechanism of a vehicle and more particularly to an axially and angularly adjustable steering column.

The present practice in most vehicles is to provide an adjustable driver's seat so that the most comfortable position relative to the accelerator, brake, or other control pedals can be attained by the driver, as determined by the length of his or her legs. However, if the steering column and wheel cannot also be adjusted, the position of the steering wheel will, more often than not, be incorrect. Thus, if a short driver adjusts the seat to a forward position so that the control pedals may be reached, the steering wheel probably will be too close to the driver's body and may even touch it. On the other hand, a tall driver who has moved the seat rearwardly may find that the steering wheel is too far away for comfort.

Accordingly, it is an object of this invention to provide an axially and angularly adjustable steering column which can be positioned relative to the driver's seat so that any normal driver regardless of his girth, size, or height will be comfortable and will have full control of the vehicle.

Another object of this invention is to provide an axially and angularly adjustable steering column and wheel which, after having been set at the desired axial and angular position, can be released through suitable mechanism so that the steering wheel will automatically move to its uppermost angular position to thereby permit ease of driver exit from and entry into the vehicle, said release mechanism being arranged so that the steering wheel can be returned to its last "set" position simply by pulling it down against a stop. In other words, this release mechanism in effect has a "memory" function in that it remembers the last "set" position and eliminates the necessity for having the driver reset the position of the steering column and wheel every time he enters the vehicle.

A further object of this invention is to provide an axially and angularly adjustable steering column which may be quickly adjusted by the driver in an easy manner.

A still further object of this invention is to provide an axially and angularly adjustable steering column which includes a "memory" mechanism, wherein axial adjustments, angular adjustments, and the memory mechanism are controlled by a single lever or hand control.

Another object of this invention is to provide an axially and angularly adjustable steering column which can be adjusted at will by the driver while the vehicle is moving so as to minimize fatigue.

The above and other objects and features of this invention will become apparent from the following description of the apparatus taken in connection with the accompanying drawings which form a part of this specification and in which:

FIGURE 1 is a side elevation of the steering column and wheel which shows various angular and axial positions of the steering wheel through use of dotted lines;

FIGURE 2 is an enlarged view similar to that of FIGURE 1 with portions thereof shown in section;

FIGURE 3 is a sectional view taken along line 3—3 of FIGURE 2;

FIGURE 4 is a sectional view taken along line 4—4 of FIGURE 2;

FIGURE 5 is a sectional view taken substantially along line 5—5 of FIGURE 2;

FIGURE 6 is a sectional view taken substantially along line 6—6 of FIGURE 2 with the locking ring shown in a non-locking position;

FIGURE 7 is a sectional view taken along line 7—7 of FIGURE 6;

FIGURE 8 is a sectional view taken along line 8—8 of FIGURE 2;

FIGURE 9 is an enlarged plan view similar to FIGURE 1 with portions broken away to show one side of the angular position locking mechanism.

FIGURE 10 shows the opposite side and complementary portion of the angular position locking mechanism removed from some of the steering column components;

FIGURE 11 is a sectional view taken substantially along line 11—11 of FIGURE 4 with the lever moved into the plane of the section for clarity;

FIGURE 12 is a sectional view; similar to FIGURE 11 which shows the operation of the "memory" mechanism;

FIGURE 13 is a dimetric view of one of the pawls of the angular position locking mechanism;

FIGURE 14 is a dimetric view of the ratchet quadrant plant utilized in connection with the angular position locking mechanism;

FIGURE 15 is a sectional view similar to FIGURE 6 showing an alternate embodiment of the axial position locking mechanism; and FIGURE 16 is a sectional view similar to FIGURE 6 showing another alternate embodiment of the axial position locking mechanism.

Referring to FIGURES 1 and 2 of the drawings, it will be seen that the steering column which is shown includes a mechanism, indicated generally by the numeral 12, for permitting axial adjustment of the steering column, a mechanism, indicated generally by the numeral 14, for permitting angular adjustment of the steering column, and a "memory" mechanism, indicated generally by the numeral 16, for returning the steering wheel 18 to its last "set" position after it is moved to its uppermost angular position to permit easier exit from and entry into the vehicle. All of these mechanisms are confined within a housing indicated generally by the numeral 20.

The mechanism for axial adjustment includes an axially fixed rectangular lower shaft 22, an axially movable shaft 24 on which has a rectangular bore 26 for receiving the upper portion of the rectangular lower shaft 22, and a cylindrical roller 28 located in a slot 30 of hollow shaft 24 for engagement with any one of a plurality of grooves 32. The roller 28 is maintained in a given groove through means of a locking ring 34 which is urged towards its locking position by a compression spring 36. Relative rotation between locking ring 34 and shaft 24 is prevented through means of a pin 35 fixed to ring 34 and a slot 37 formed in shaft 24. A ramp 38 formed on the inner surface of the ring 34 permits the roller 28 to move from one groove to the other, as desired, so long as the ring is moved against spring 36 to a non-locking position. Movement of the ring 34 to a non-locking position is accomplished through means of a sleeve 40 which abuts ring 34, an actuator ring 42, which abuts sleeve 40 and has oppositely disposed trunnions 44 and 46, two levers 48 and 50 which are operatively connected to cross-shaft 52 and abut trunnions 44 and 46, respectively, and an external hand controlled lever 54 which is operatively connected to the cross-shaft.

The steering column includes a plurality of concentric tubes, one of which is a stationary lower tube 56 which is attached to the frame (not shown) of the vehicle through means of a U-shaped bracket 58 and bolts 60, a movable outer tube 62 which is suitably attached to the upper movable portion of the steering column, an axially movable non-rotatable inner tube 64 which is also suitably connected to the upper movable portion of the steering column, and a rotatable and axially movable gear shift tube 66 which is suitably connected to gear shift lever 68 at the upper end and operatively connected to the gear shift control lever 69 at the lower end. A pair of stop members 70 and 72, are attached to the movable inner tube 64 and limit the amount of axial movement of the steering column by abutment with stationary bolt 74. A plurality of spring loaded slipper type bearings 76 are operatively connected to and slidable with tubes 64 and 66 for maintaining these tubes centered with respect to stationary tube 56.

The mechanism for angularly adjusting the steering column includes a universal joint 80 of the type described and claimed in Dean E. Runkle's copending applications Serial Nos. 304,551, now Patent No. 3,217,516, and 424,431, wherein a pair of forked members 82 and 84 are positioned at right angles with respect to each other and are coupled together by diametrically opposed balls 86 and 88 and an adjustable center retaining mechanism 90. The lower forked member 82 is formed on or suitably attached to the end of the axially movable shaft 24, whereas the upper forked member 84 of the universal joint is formed on or attached to the steering shaft 92. The steering wheel may be angularly positioned to any one of a plurality of positions through means of a ratchet engaging mechanism. In the particular embodiment described and shown, five positions are available. More specifically, as shown in FIGURES 2, 3, 9, 10, 13 and 14, it will be seen that a plate 94 has two oppositely disposed flange-like quadrants 96 and 98 which are pivotally hinged to pins 100 and 102, respectively. The pins are fixedly connected to a hub type member 104 through means of perpendicularly projecting members 106 and 108. The hub type member is attached to a portion of the steering column housing through suitable means, such as bolts 110, which have rubber bumpers 112 attached to the head thereof. Needle bearings 113 are located between the hub member 104 and shaft 24. Formed on the ends of quadrants 96 and 98 are ratchets 114 and 116, the grooves of which are engaged by edges 118 and 120 of pawls 122 and 124, respectively. The pawls are operatively connected to the cross-shaft 52 and are urged into engagement with one of the grooves in ratchets 114 and 116 through means of springs 126 and 128. It will be noted from FIGURES 9 and 10 that ratchet 96 has three grooves, whereas ratchet 98 has two grooves. Furthermore, it will be noted that the grooves of one ratchet are staggered with respect to the grooves of the other ratchet, so that when pawl 122 is in one of the grooves of ratchet 114, pawl 124 will be out of the grooves of ratchet 116. Through use of such an arrangement, five different angular steering wheel positions are possible without sacrificing the strength of the ratchet teeth by placing five grooves on each ratchet.

Both axial and angular adjustments of the steering column are controlled by movement of external hand lever 54 in the following manner: Referring to the drawings, it will be seen that axial adjustment of the steering column is accomplished by upward movement of lever 54 which will cause counterclockwise rotation of the cross-shaft 52 and consequent downward movement of levers 48 and 50. Since these levers are in abutment with the trunnions 44 and 46 of ring 42, such downward movement will cause concomitant downward movement of ring 42, sleeve 40, and locking rings 34. Upon movement of the locking ring 34 to a position, as shown in FIGURE 7, the operator of the vehicle can move the shaft 24 axially with respect to the shaft 22 simply by pushing or pulling on the steering wheel 18 and upon release of the lever 54 the locking ring 34 will return to its locking position and will force the roller 28 into one of the other grooves 32 in the shaft 24 to prevent further axial movement. Because of the ramp 38 on the locking ring and compression spring 36, the cylindrical roller 28 is in effect spring loaded so as to cause frictional engagement between the shafts 22 and 24 to thereby eliminate torsional lash therebetween.

FIGURES 15 and 16 show two other embodiments for locking the axially movable shaft and for eliminating torsional lash. In FIGURE 15, in which like parts are designated by like members plus 300, a polygonal shape other than a rectangle is utilized to eliminate torsional lash. In FIGURE 16, in which like parts are designated by like numbers plus 400, the axially movable shaft is made from tubing 424 with an inward indentation 425 which is received in a groove 427 of the fixed shaft 422. In all of the embodiments, the spring loaded roller is utilized to cause frictional engagement between the movable and fixed shafts.

Angular adjustment of the steering column is accomplished by downward movement of the lever 54 which will cause clockwise rotation of the cross-shaft 52 and the pawls 122 and 124. Such clockwise rotation of the pawls causes disengagement thereof from the ratchets 114 or 116 and permits the operator to move the steering wheel angularly to any one of five positions by virtue of the universal joint 80. Upon release of the lever 54, the pawl springs 126 and 128 will force one or the other of the pawls 122 or 124 into engagement with its associated ratchet to thereby lock the steering wheel in the desired angular position.

In order to permit the driver to more easily exit from or enter the vehicle, the steering column includes a "memory" mechanism which permits the steering wheel to be moved to its uppermost angular position and to return it to its last set position without releasing the axial or angular locking mechanisms. This memory mechanism includes a latch 130 which is pivotally connected through means of a pin 132 to an inner wall 134 of the steering column housing. The latch, which extends through a square opening 136 in ratchet plate 94 and engages the edge thereof, as shown in FIGURE 11, is maintained in engagement with the plate through means of a spring 138. In order to disengage the latch, the lever 54 is pulled by the operator in an outward direction against compression spring 139, as shown in FIGURE 12. Such movement causes latch pin 140 which is attached to cross-shaft 52 to move against the latch and move it to a non-engaging position. With the latch 130 in a non-engaging position, the upper portion of the steering column, which is also pivotally connected to pins 100 and 102 through journals 142 and 144 attached to inner wall 134 of the housing by bolts 145, will be pulled to its uppermost angular position and against rubber bumper 112 by a pair of springs 146 and 148. It will be noted that such pivotal movement about pins 100 and 102 does not disengage roller 28 from its associated groove nor pawls 122 or 124 from the associated ratchets. After the operator has entered the vehicle, the steering wheel can be returned to its last previous set position simply by pulling the steering wheel downwardly and bringing the inner wall 134 into engagement with the rubber bumpers 150 and 152 at which time the latch spring 138 will have caused the latch 130 to once again engage the ratchet plate 94.

From the foregoing, it will be seen that a single lever 54 controls three different mechanisms, namely, the axial adjustment mechanism, the angular adjustment mechanism and the memory mechanism.

The several practical advantages which flow from this type of an adjustable steering column arrangement are believed to be obvious from the above, and other advantages may suggest themselves to those who are familiar with the art to which this invention relates.

Furthermore, although this invention has been described in connection with a specific embodiment, it will be obvious to those skilled in the art that various changes may be made in the form, structure, and arrangement of parts without departing from the spirit of the invention. Accordingly, I do not desire to be limited to the specific embodiment disclosed herein primarily for purposes of illustration, but instead desire protection falling within the scope of the appended claims.

Having thus described the various features of the invention, what I claim as new and desire to secure by Letters Patent is:

1. An adjustable steering column comprising a housing having a first non-movable portion, a second portion axially movable with respect to said first portion, and a third portion angularly movable with respect to said second portion, a first non-movable shaft having a plurality of axially spaced grooves thereon, a second shaft operatively connected to said second portion of said housing and telescoped over said first shaft, said second shaft being axially movable with respect to said first shaft and having opening means adjacent said grooves, means for preventing relative rotation between said first and second shafts, a third shaft operatively connected to said third portion of said housing and to said second shaft for causing rotation of said second shaft, said operative connection between said second and third shafts including universal joint means for permitting said third shaft to be angularly positioned with respect to said second shaft, roller means located in said opening means for engaging one of said grooves, ring means telescoped over said second shaft and movable axially with respect thereto, said ring means having a first position for forcing said roller means into one of said grooves to thereby prevent axial movement between said first and second shafts and a second position for permitting said roller means to move from one groove to another when said second shaft is moved axially with respect to said first shaft, spring means for urging said ring means from said second to said first position, ratchet means pivotally connected to said second portion of said housing, latch means for connecting said ratchet means with said third portion of said housing so that angular movement of said third shaft will cause concomitant movement of said third portion of said housing and said ratchet means, locking means operatively connected to said second portion of said housing for engaging said ratchet means and preventing a change in the angular position of said third shaft with respect to said second shaft, resilient means for urging said locking means into engagement with said ratchet means and manually operable actuating means movable in any one of three directions, the first of which causes movement of said ring means from said first to said second position to permit said second shaft to move axially with respect to said first shaft, the second of which causes disengagement of said locking means from said ratchet means to permit said third shaft to move angularly with respect to said second shaft and the third of which causes disengagement of said latch means so that said third shaft and third portion of said housing can move angularly with respect to said second shaft without disengagement of said locking means from said ratchet means.

2. An adjustable steering column comprising a housing having a first non-movable portion, a second portion axially movable with respect to said first portion, and a third portion angularly movable with respect to said second portion, a first non-movable shaft having a plurality of axially spaced grooves thereon, a second shaft operatively connected to said second portion of said housing and telescoped over said first shaft, said second shaft being axially movable with respect to said first shaft and having a slot adjacent said grooves, means formed on said first and second shafts for preventing relative rotation therebetween, a third shaft operatively connected to said third portion of said housing and to said second shaft for causing rotation of said second shaft, said operative connection between said second and third shafts including universal joint means for permitting said third shaft to be angularly positioned with respect to said second shaft, a cylindrical roller located in said slot for engaging one of said grooves, a ring telescoped over said second shaft and movable axially with respect thereto, said ring having a first position for forcing said roller into one of said grooves to thereby prevent axial movement between said first and second shafts and a second position for permitting said roller to move from one groove to another when said second shaft is moved axially with respect to said first shaft, spring means for urging said ring from said second to said first position, a cross-shaft and spindle means operatively connected to said second portion of said housing, said spindle means having an axis parallel to said cross-shaft and coincident with the axis of said universal joint, lever means operatively connected to said cross-shaft for causing movement of said ring from said first to said second position upon rotation of said cross-shaft in one direction, ratchet means pivotally connected to said spindle means, a latch for connecting said ratchet means with said third portion of said housing so that angular movement of said third shaft will cause concomitant movement of said third portion of said housing and said ratchet means, a latch pin operatively connected to said cross-shaft and in abutment with said latch, pawl means operatively connected to said cross-shaft for engaging said ratchet means and preventing a change in the angular position of said third shaft with respect to said second shaft, spring means for urging said pawl means into engagement with said ratchet means, and manually operable means operatively connected to said cross-shaft for causing rotation thereof in one of two directions and movement thereof in an axial direction, said one direction of rotation causing said lever means to move said ring from said first to said second position to permit said second shaft to move axially with respect to said first shaft, said other direction of rotation causing said pawl means to become disengaged from said ratchet means to permit said third shaft to move angularly with respect to said second shaft, and said axial direction of movement causing said latch pin to disengage said latch from said ratchet means so that said third shaft and third portion of said housing can move angularly with respect to said second shaft without disengagement of said pawl means from said ratchet means.

3. An angularly adjustable steering column comprising a housing having a first portion angularly movable with respect to a second portion thereof, first and second shafts capable of being rotated with their axes angularly disposed with respect to one another, said first shaft being operatively connected to said first portion of said housing and said second shaft being operatively connected to said second portion of said housing, universal joint means operatively connecting said first and second shafts so that said first shaft can be angularly positioned with respect to said second shaft, ratchet means operatively connected to and movable with said first shaft, locking means operatively connected to said second portion of said housing for engaging said ratchet means and preventing a change in the angular position of said first shaft with respect to said second shaft, latch means for connecting said ratchet means with said first portion of said housing so that angular movement of said first shaft will cause concomitant movement of said first portion of said housing and said ratchet means, resilient means for urging said locking means into engagement with said ratchet means, and manually operable actuating means movable in a first direction for disengaging said locking means from said ratchet means to permit angular movement of said first shaft with respect to said second shaft and subsequent re-engagement of said locking means with said ratchet means upon release of said actuating means, said manually operable actuating means being movable in a second direction for disengaging said latch means so that said first shaft and first portion of said housing can move angularly with respect to said second shaft without disengagement of said locking means from said ratchet means.

4. An angularly adjustable steering column, as defined in claim 3, wherein said ratchet means includes a plate having an opening therein and two oppositely disposed quadrants each of which has a ratchet formed on the end thereof, and said locking means includes two pawls, one of which engages the ratchet of one of said quadrants and the other of which engages the ratchet of the other of said quadrants.

5. An angularly adjustable steering column, as defined in claim 4, wherein said latch means includes a spring loaded latch which extends through said opening in said plate and engages the edge thereof, said latch being pivotally attached to said first portion of said housing.

6. An angularly adjustable steering column, as defined in claim 5, wherein said manually operable actuating means includes a latch pin in abutment with said latch for disengaging said latch from said plate upon movement of said manually operable actuating means in said second direction.

7. An angularly adjustable steering column, as defined in claim 6, wherein spring means are operatively connected to said first portion of said housing and cause upward angular movement of said first shaft and said first portion of said housing upon disengagement of said latch from said plate.

8. An angularly adjustable steering column comprising a housing, first and second shafts located in said housing and capable of being rotated with their axes angularly disposed with respect to one another, universal joint means operatively connecting the first of said shafts with the second of said shafts so that said first shaft can be angularly positioned with respect to said second shaft, ratchet means operatively connected to and movable with said first shaft, said ratchet means including a plate having two oppositely disposed quadrants each of which has a ratchet formed on the end thereof, locking means operatively connected to said housing for engaging said ratchet means and preventing a change in the angular position of said first shaft with respect to said second shaft, said locking means including two pawls, one of which engages the ratchet of one of said quadrants and the other of which engages the ratchet of the other of said quadrants, manually operable actuating means operatively connected to said housing and said locking means for disengaging said locking means from said ratchet means and permitting angular movement of said first shaft with respect to said second shaft, and resilient means operatively connected to said locking means for causing engagement thereof with said ratchet means after release of said manually operable actuating means.

9. An angularly adjustable steering column, as defined in claim 8, wherein the grooves of one of the ratchets are staggered with respect to the grooves of the other ratchet so that when one of said pawls is located in a ratchet groove the other of said pawls will be located out of the ratchet grooves.

References Cited by the Examiner
UNITED STATES PATENTS

| | | | |
|---|---|---|---|
| 1,226,411 | 5/1917 | Thomas | 74—493 |
| 2,744,419 | 5/1956 | Chayne | 74—493 |
| 3,199,625 | 8/1965 | Liebreich. | |

MILTON KAUFMAN, *Primary Examiner.*